Sept. 10, 1963 J. O. VITALE 3,103,615

AMPLIFIER AND TWO-PHASE MOTOR CONTROL CIRCUIT

Filed May 17, 1961 2 Sheets-Sheet 1

INVENTOR.
JOSEPH O. VITALE
BY Herbert L. Davis
ATTORNEY

AMPLIFIER AND TWO-PHASE MOTOR CONTROL CIRCUIT

Filed May 17, 1961 2 Sheets-Sheet 2

INVENTOR.
JOSEPH O. VITALE
BY Herbert L. Davis
ATTORNEY

3,103,615
AMPLIFIER AND TWO-PHASE MOTOR CONTROL CIRCUIT

Joseph O. Vitale, Wayne, N.J., assignor to The Bendix Corporation, Teterboro, N.J., a corporation of Delaware Filed May 17, 1961, Ser. No. 110,799
15 Claims. (Cl. 318—207)

The present application is a continuation-in-part of U.S. application Serial No. 89,947, now abandoned, filed February 17, 1961, by Joseph O. Vitale and assigned to The Bendix Corporation.

The invention relates to an amplifier and two-phase motor control circuit and more particularly to such a control circuit in which there is provided in the amplifier an electronic flow control means of a type such as an electronic valve having a plate, cathode and control grid or semiconductor device of a type such as a transistor having a collector, emitter and base and an output circuit to the control winding of the motor including a cathode or emitter follower circuit which in addition to transferring power from the amplifier to the motor control winding provides a very high negative feedback which prevents oscillation in the output signal applied to the control winding so that the necessity of gain controls or a rate generator feedback in the control of the two-phase motor is effectively eliminated.

An object of the invention is to provide an amplifier and two-phase motor control circuit having a high gain low power cathode or emitter follower circuit in the amplifier output circuit to the control winding of the motor.

Another object of the invention is to provide an amplifier and two-phase servo motor control circuit in the low price range with good stability, high gain and good dependability.

Another object of the invention is to provide an amplifier and two-phase servo motor control circuit in which the amplifier includes an electron flow control device of a type having electrodes between which an electron flow may be effected and an electron flow control element, and in which there is provided a circuit for following a change in the electron flow between said electrodes and serving as an output circuit from the amplifier to the control winding of the servo motor so as to eliminate the need for utilization of a conventional power transformer in the output circuit as an impedance matching device, while in addition to providing for the effective transfer of power from the amplifier to the servo motor load the follower circuit further provides a very high negative feedback which serves to prevent oscillation in the control winding of the servo motor so as to eliminate the need for utilization of the conventional gain controls or anti-hunting rate generator feedback circuits.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 1:
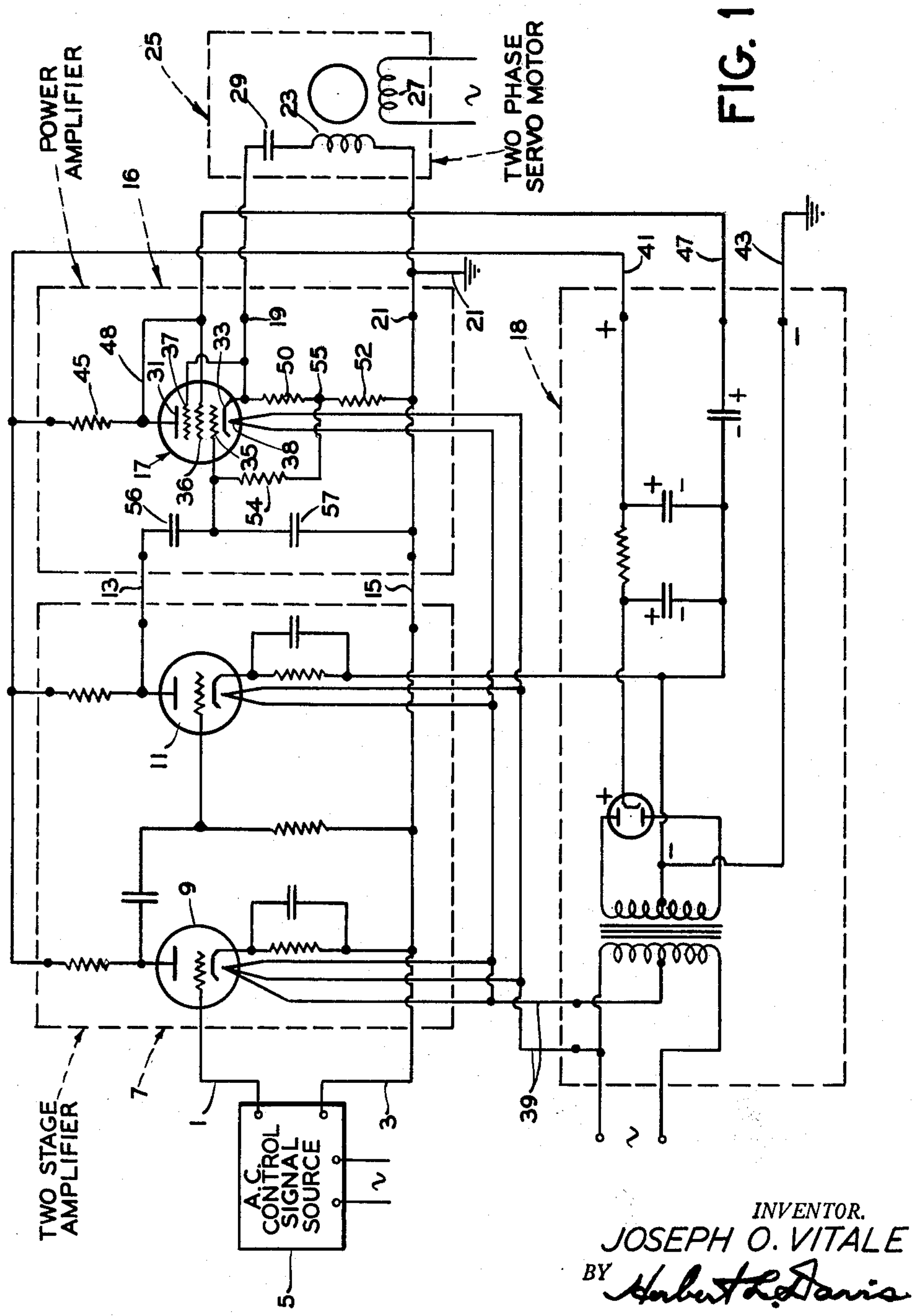
FIGURE 1 is a schematic wiring diagram of an amplifier and two-phase motor control circuit embodying the present invention.

Referring to the drawing of FIGURE 1, lines 1 and 3 lead from an A.C. control signal source indicated generally by the numeral 5 and of conventional type to the input of an amplifier 7. The amplifier 7 may be of a conventional two-stage type utilizing a pair of electronic valves 9 and 11 of the triode type in a conventional resistance-capacitance coupled circuit and having output lines 13 and 15 leading to the input of a power amplifier 16 utilizing an electronic valve 17 of the pentode type. A source of electronic energy for operating the amplifiers 7 and 16 is indicated generally by the numeral 18 and may be of a conventional type.

Output lines 19 and 21 lead from the power amplifier 16 to a control winding 23 of a two-phase servo motor 25 of conventional type having a fixed phase winding 27. There is further provided a phase shifting capacitor 29 in the line 19.

The power amplifier 16, as shown, may include the pentode type electronic valve 17 having a plate or anode element 31, a cathode or cathode element 33, a control grid or control electrode 35, a screen grid 36, suppressor or cathode grid 37 and heater 38. The heater 38 is energized from output connections 39 from the power source 18 while other output connections from the power source 18 including high voltage positive conductor 41 and grounded conductor 43 are connected respectively to the plate 31 through a plate resistor 45 and to the cathode 33 through the grounded connection 21 of the amplifier 16. A third conductor 47 from the power source 18 is arranged so as to supply a potential to the screen grid 36 somewhat less positive than that supplied by the conductor 41 to the resistor 45. The opposite end of the resistor 45 is connected to the plate 31 and through a conductor 48 to the screen grid 36 and conductor 47.

Further connected in the circuit to the cathode 33 of the electronic valve 17 is a cathode follower circuit, including the cathode resistors 50 and 52. The cathode resistor elements are connected across the amplifier output lines 19 and 21.

Further included in the cathode follower circuit is a resistor element 54 having one end thereof connected to a point 55 between the cathode resistors 50 and 52 while the opposite end of the resistor 54 is connected to the control grid 35 of the electronic valve 17. Moreover through a coupling capacitor 56, the control grid 35 and resistor 54 are coupled to the output line 13 from the two-stage amplifier 7. The opposite output line 15 from the amplifier 7 is connected to the line 21 and through resistors 50 and 52 to the cathode 33 of the electronic valve 17. Further a capacitor 57 is shunted across the resistors 52 and 54 and thereby across the input to the control grid 35 and cathode 33 from the amplifier 7. The foregoing provides a cathode follower output through the lines 19 and 21 to the control winding 23 of the two-phase servo motor 25 which does not need to utilize the conventional induction type transformer for power transference to the control winding 23 of the two-phase servo motor 25.

Although the conventional transformer output is a good impedance matching device, it does not have the advantages which are present in the described cathode follower output in the transference of the controlling signal to the control winding 23 of the two-phase servo motor 25.

The cathode follower circuit provides a degenerative circuit in which an inverse feedback is obtained by way of the unbypassed cathode resistor elments 50 and 52 and across which the output is taken through lines 19 and 21. This circuit also provides an impedance-matching or impedance-lowering device having less than unity voltage gain but capable of producing power gain. Its high input impedance and very low output impedance render it particularly suitable for coupling between pulse-generating or pulse-transmitting stages of the amplifiers 7 and 16 and the output lines 19 and 21 leading to the circuit for the control winding 23 of the servo motor 25 and including the phase shifting capacitor 29.

In addition to the transfer of power from the amplifiers 7 and 16 to the load of the controlled motor 25, the cathode follower output to the lines 19 and 21 "follows" the control grid 35 input voltage applied across line 15 and grid 35 and hence is of the same polarity and provides good regulation because of its low impedance. The cathode follower circuit has a very high negative feedback which prevents oscillation and eliminates the need for providing gain controls or a rate generator anti-hunting feedback signal.

Thus, if a more positive signal is applied to the grid 35, a resulting increase in the flow of plate current through resistors 50 and 52 produces a greater fall in potential across the resistors 50 and 52 making the cathode 33 more positive. Likewise a more negative signal applied to the grid 35 causes a decrease in the fall in potential across the resistors 50 and 52 making the cathode 33 less positive. Thus the voltage across the cathode resistors "follows" the signal voltage applied to the grid 35 and in effect tends to reduce the voltage difference between the grid 35 and cathode 33, as established by the input signal, and in turn reduces the effectiveness of the input signal so as to provide a retarding or negative feedback anti-hunting effect.

Furthermore, in order to accommodate negative signals of high amplitude on the control grid 35 without an attendant cut-off limiting effect of the control valve 17, the cathode follower resistor elements 50 and 52 have connected therebetween at the point 55 one end of the resistor element 54 leading to the control grid 35. The negative signal bias applied to the control grid 35 is thereby reduced because the grid resistor element 54 is terminated at a more positive point 55 between the cathode resistor elements 50 and 52 and therefore can swing to a greater negative value so as to permit the electronic valve 17 to operate over a wide range of signals without cutting off the electron flow through the electronic valve 17.

The capacitor 57 shunted across the cathode resistor element 52 and grid resistor element 54 and between the control grid 35 and cathode follower output line 21 increases the overall effect of the cathode follower circuit in providing greater stability of control by tending to smooth out transient fluctuations in the input control signals applied across the lines 13 and 15, so as to prevent oscillations in the output control signal applied across the output lines 19 and 21 leading to the phase shifting capacitor 29 and control winding 23 to effect an accurate and stable control of the two-phase servo motor 25.

*Second Form of Invention*

Figure 2:
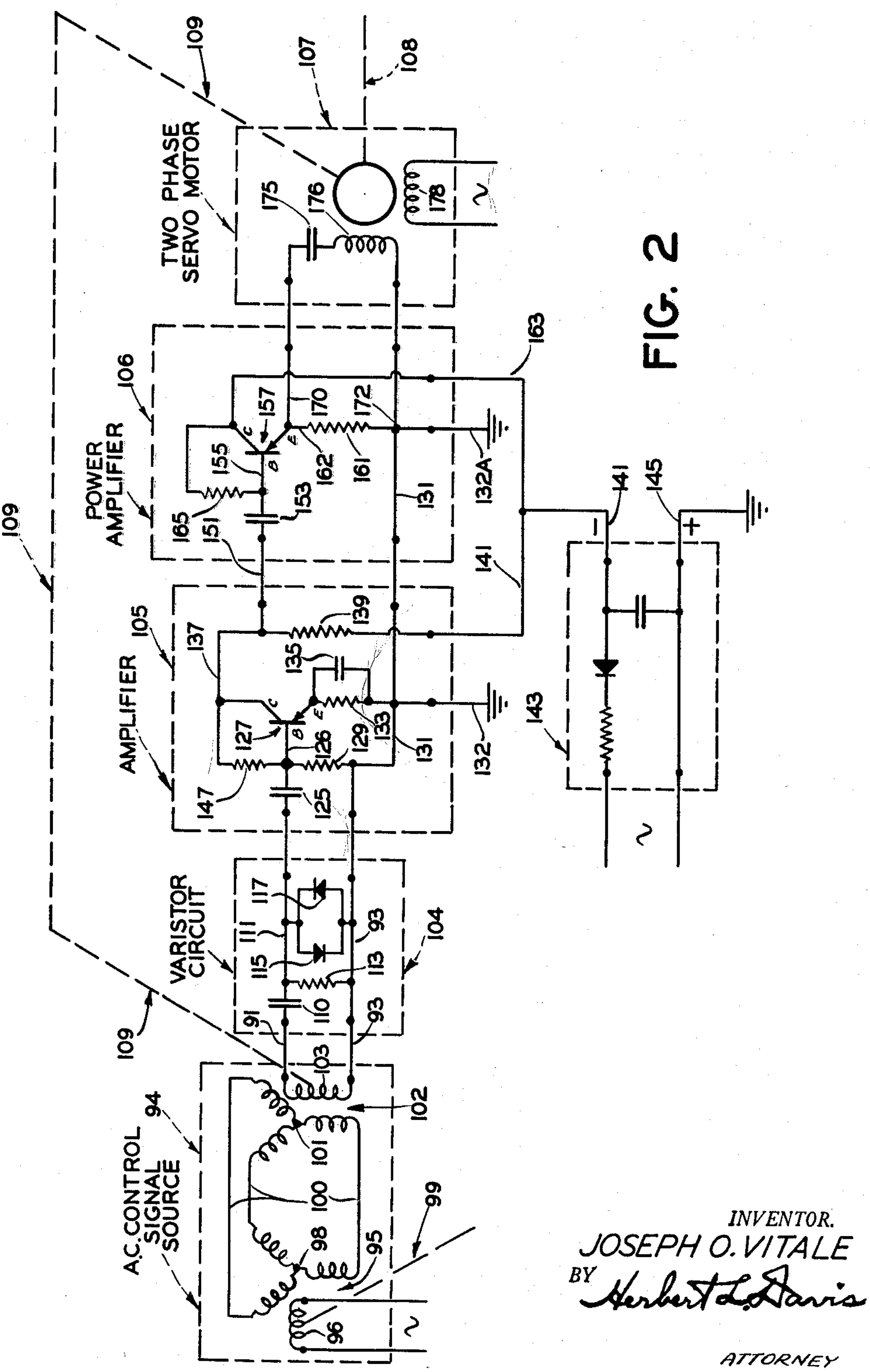
FIGURE 2 is a schematic wiring diagram of a second form of the invention.

In the second form of the invention illustrated by FIGURE 2, lines 91 and 93 lead from an A.C. control signal device, indicated generally by the numeral 94 and which may be of a conventional type, including a synchro signal transmitter 95 having a rotor winding 96 connected across a suitable source of alternating current and inductively coupled to synchro stator windings 98 connected by electrical conductors 100 to stator windings 101 of a synchro signal receiver 102 having a rotor winding 103 connected across the output lines 91 and 93.

The rotor winding 96 of the signal transmitter 95 may be adjustably positioned relative to the stator windings 98 by a shaft 99 manually or automatically operated by a suitable control mechanism, not shown, so as to effect through the stator windings 98 and 101 a suitable control signal in the rotor winding 103 dependent upon the relative angular positions of the rotor windings 96 and 103 to the respective stator windings 98 and 101. The signal induced in the motor winding 103 is such as to cause through varistor circuit 104, amplifier 105 and power amplifier 106, as hereinafter explained, operation of a two-phase servo motor 107 in a direction to position a main control shaft 108 and readjust through a follow-up shaft 109 the rotor winding 103 to an angular position corresponding to that of the rotor winding 96 and at which a null signal across the lines 91 and 93 is effected.

As shown in FIGURE 2, the lines 91 and 93 lead through a varistor circuit 104 to the input of the amplifier 105. The varistor circuit 104 includes a capacitor 110 between the input line 91 and an output line 111 leading to the input of the amplifier 105, while connected across the input line 93 leading to the input of the amplifier 105 is a resistor 113. The capacitor 110 and resistor 113 arrangement is such as to effect a suitable shift in the phase of the A.C. control signal applied through the lines 91 and 93 and lines 111 and 93 to the input of the amplifier 105.

A pair of diodes 115 and 117 arranged in opposite polarity are connected across the lines 93 and 111. The diodes 115 and 117 may be of a conventional compressed silicon carbide type having a characteristically markedly reduced resistance when the applied voltage is increased above a predetermined value and so selected as to in effect limit the resulting signal strength to within a preselected range so as to thereby prevent the amplifier 105 as well as power amplifier 106 and servo motor 107 controlled therethrough from being overdriven or damaged in the event of a signal of excessive voltage. The silicon diodes 115 and 117 have the characteristics of extremely low current conductivity at potentials below a preselected value while at potentials in excess of the preselected value the conductivity of the diodes 115 and 117 increases markedly so as to attenuate relatively high control signals applied across the lines 93 and 111 while relatively low control signals are substantially uneffected by the diodes 115 and 117.

The amplifier 105 and power amplifier 106 are further so arranged as to provide the maximum permissible high gain for those signals in the low control signal range and thereby provide through the amplifier 105 and power amplifier 106 a good sharp signal in response to those signals in the low control signal range for effectuating the control of the servo motor 107.

The attenuating effect of the diodes 115 and 117 on that portion of the high control signal in excess of the low control signal range is such that the resulting attenuated control signal while slightly greater than that resulting from signals in the low control signal range will be sufficiently attenuated as not to exceed the preselected limited range.

The output signal from the varistor circuit 104 is applied across lines 93 and 111 to the input of the amplifier 105. In the amplifier 105, the line 111 is in turn coupled through a capacitor 125 to a line 126 leading to the base of a transistor 127. The capacitor 125 effects a suitable shift in the phase of the A.C. signal applied therethrough. A resistor 129 is connected between the base of the transistor 127 and the input lead 93 which is in turn connected through a lead 131 to ground connections at 132 and 132A. A resistor 133 having an A.C. bypass capacitor 135 makes a connection between the ground connected lead 131 and the emitter of transistor 127.

A conductor 137 leads from the collector of the transistor 127 to one end of a resistor 139 while the opposite end of the resistor 139 is connected through a conductor 141 to a negative terminal of a suitable source of direct current indicated generally by the numeral 143 and which may be of a conventional type such as shown schematically in FIGURE 2. The positive terminal of the source of direct current 143 is connected by a conductor 145 to a ground connection. A resistor 147 is connected between the conductor 137 leading from the collector and the conductor 126 leading to the base of the transistor 127.

Further leading from the conductor 137 is a conductor 151 leading to the input of the power amplifier 106 while the grounded conductor 131 provides the opposite input lead for the power amplifier 106.

In the power amplifier 106 the input lead 151 is coupled by a capacitor 153 to a conductor 155 leading to the base of the transistor 157 while the grounded input lead 131 is connected to one end of a resistor 161 connected at the opposite end by a conductor 162 to the emitter of the transistor 157. The capacitor 153 effects a further suitable shift in the phase of the A.C. signal applied therethrough to the base of the transistor 157.

The collector of the transistor 157 is in turn connected by a conductor 163 to the conductor 141 leading to the negative terminal of the source of electrical energy 143. A resistor 165 is connected between the conductor 163 leading from the collector and the conductor 155 leading to the base of the transistor 157.

Output conductors 170 and 172 lead from opposite ends of the resistor 161 so as to provide an emitter follower circuit coupled by a capacitor 175 to a variable control winding 176 of the two-phase servo motor 107 having a fixed phase winding 178 connected to the source of alternating current. The capacitor 175 provides a D.C. block to prevent the winding 176 from shunting the resistor 161. Further the capacitors 110, 125, 153 and 175 effect a total ninety (90°) degree shift in the phase of the A.C. control signal applied therethrough to the winding 176 so as to cause the operation of the servo motor 107, as heretofore explained.

Further the emitter follower output applied through the lines 170 and 172 to the control winding 176 of the two-phase servo motor 107 does not need to utilize the conventional induction type transformer for power transference to the control winding 176 of the two-phase servo motor 121.

The emitter follower circuit provides a degenerative circuit in which an inverse feedback is obtained by way of the unbypassed emitter resistor 161 and across which the output is taken through lines 170 and 172. This circuit also provides an impedance-matching or impedance-lowerin device having less than unity voltage gain but capable of producing power gain. Its high input impedance and very low output impedance render it particularly suitable for coupling between pulse-generating or pulse-transmitting stages of the amplifiers 105 and 106 and the output lines 170 and 172 leading to the circuit for the control winding 176 of the servo motor 107 and including the phase shifting capacitor 175.

In addition to the transfer of power from the amplifier 105 and 106 to the load of the controlled motor 107, the emitter follower output to the lines 170 and 172 "follows" the voltage of the input control signal applied across the line 131 and the line 155 to the base of the transistor 157 and hence is of the same polarity and provides good regulation because of its low impedance. The emitter follower circuit has a very high negative feedback which prevents oscillation and eliminates the need for providing gain controls or a rate generator anti-hunting feedback signal.

Thus, if a more positive signal is applied to the base of the transistor 157, a resulting decrease in the flow of the collector current through resistor 161 produces a decrease in the fall in potential across the resistor 161 making the conductor 162 more positive. Likewise a more negative signal applied to the base 155 causes an increase in the fall in potential across the resistor 161 making the conductor 162 less positive. Thus the voltage across the emitter resistor 161 "follows" the signal voltage applied to the base of the transistor 157 and in effect tends to reduce the voltage difference between the base and emitter of the transistor 157, as established by the input signal, and in turn reduces the effectiveness of the input signal so as to provide a retarding or negative feedback anti-hunting effect.

Further due to the selective arrangement of the amplifiers 105 and 106 in cooperative relation to the varistor circuit 104, high gain amplification is provided for low range signals while high range signals are effectively attenuated to prevent overdrive of the respective transistors 127 and 157 so as to thereby effect good sharp servo signals during both low and high range signals, while the emitter follower circuit including resistor 161 and output leads 170 and 172 in following the high gain low range signals, as the case may be, provides a very high negative feedback which prevents oscillation and eliminates the need for providing a rate generator anti-hunting feedback signal.

Although but two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In an amplifier and control circuit for a two-phase motor of a type including an electronic valve having an anode element, a cathode element and a control electrode, means for impressing a variable pulsating electrical input signal across said cathode element and control electrode, and said two-phase motor having a fixed phase winding and a variable phase control winding including a phase shifting capacitor coupled with the control winding; the improvement comprising a resistor serially connected in said control circuit with said cathode element and electrical conductors leading from opposite ends of said resistor for directly transferring a controlling pulsating output signal across said control winding and phase shifting capacitor coupled thereto.

2. In an amplifier and control circuit for a two-phase motor of a type including an electronic valve having an anode element, a cathode element and a control electrode, means for impressing a variable pulsating electrical input signal across said cathode element and control electrode, and said two-phase motor having a fixed phase winding and a variable phase control winding including a phase shifting capacitor coupled with the control winding; the improvement comprising a first resistor serially connected in said control circuit with said cathode element, electrical conductors leading from opposite ends of said first resistor for directly transferring a controlling pulsating output signal across said control winding and phase shifting capacitor coupled thereto, and a second resistor connected at one end to said first resistor and through at least a part of said first resistor to said cathode element and at an opposite end to said control electrode to provide a high negative feedback through said second resistor to the control electrode to prevent oscillation of the controlling pulsating output signal.

3. In an amplifier and control circuit for a two-phase motor of a type including an electronic valve having an anode element, a cathode element and a control electrode, means for impressing a variable pulsating electrical input signal across said cathode element and control electrode, and said two-phase motor having a fixed phase winding and a variable phase control winding including a phase shifting capacitor coupled with the control winding; the improvement comprising a first resistor serially connected in said control circuit with said cathode element, electrical conductors leading from opposite ends of said first resistor for directly transferring a controlling pulsating output signal across said control winding and phase shifting capacitor coupled thereto, a second resistor connected at one end to said first resistor and through at least a part of said first resistor to said cathode element and at an opposite end to said control electrode to provide a high negative feedback through said second resistor to the control electrode to prevent oscillation of the controlling pulsating output signal, and a capacitor coupled between said control electrode and said interconnected first and second resistors to stabilize the input signal impressed across said cathode element and control electrode by smoothing out transient fluctuations therein.

4. In an amplifier and control circuit for a two-phase motor of a type including an electronic valve having an anode element, a cathode element and a control electrode, means for impressing a variable pulsating electrical input signal across said cathode element and control electrode, and said two-phase motor having a fixed phase winding and a variable phase control winding including a phase shifting capacitor coupled with the control winding; the improvement comprising a first resistor and a second resistor serially connected in said control circuit with said cathode element, electrical conductors leading from opposite ends of the serially connected first and second resistors and directly transferring a controlling pulsating output signal across said control winding and phase shifting capacitor coupled thereto, a third resistor connected at one end to said control electrode and at an opposite end to said first and second resistors at a point between said serially connected resistors and through said first resistor to said cathode element so as to permit operation of the electronic valve over a wide range of input signals impressed across said cathode element and control electrode while providing a high negative feedback through said third resistor to the control electrode to prevent oscillation of the controlling pulsating output signal.

5. In an amplifier and control circuit for a two-phase motor of a type including an electronic valve having an anode element, a cathode element and a control electrode, means for impressing a variable pulsating electrical input signal across said cathode element and control electrode, and said two-phase motor having a fixed phase winding and a variable phase control winding including a phase shifting capacitor coupled with the control winding; the improvement comprising a first resistor and a second resistor serially connected in said control circuit with said cathode element, electrical conductors leading from opposite ends of the serially connected first and second resistors and directly transferring a controlling pulsating output signal across said control winding and serially connected phase shifting capacitor coupled thereto, a third resistor connected at one end to said control electrode and at an opposite end to said first and second resistors at a point between said serially connected resistors and through said first resistor to said cathode element so as to permit operation of the electronic valve over a wide range of input signals impressed across said cathode element and control electrode while providing a high negative feedback through said third resistor to the control electrode to prevent oscillation of the controlling pulsating output signal, and a capacitor electrically connected to said control electrode and across said second and third resistors to stabilize the input signal impressed across said cathode element and control electrode from transient fluctuations therein.

6. The combination comprising an electronic valve having an anode element, a cathode element and a control electrode, means for impressing a variable pulsating electrical input signal on said control electrode, a two-phase motor having a fixed phase winding and a variable phase control winding, a resistor serially connected in circuit with said cathode element, said resistor connected across a pair of electrical output conductors, one of said output conductors effecting an electrical connection to one end of the control winding of said two-phase motor, and a capacitor for coupling the other of said output conductors to another end of said control winding so as to apply a controlling pulsating electrical output signal across said control winding.

7. The combination comprising a two-phase motor having a fixed phase winding and a variable phase control winding, an electronic valve having an anode element, a cathode element, and a control electrode, a resistor connected at one end to said cathode element, means for impressing a variable pulsating electrical input signal to said control electrode and other end of said resistor and through said resistor to said cathode element, said resistor connected across a pair of electrical output conductors, one of said output conductors effecting an electrical connection to one end of the control winding of said two-phase motor, a capacitor for coupling the other of said output conductors to another end of said control winding so as to apply a controlling pulsating electrical output signal across said control winding, and another capacitor connected between said control electrode and said other end of said resistor so as to stabilize the impressed input signal.

8. The combination comprising a two-phase motor having a fixed phase winding and a variable phase control winding, an electronic valve having an anode element, a cathode element, and a control electrode, a resistor connected at one end to said cathode element, means for impressing a variable pulsating electrical input signal to said control electrode and other end of said resistor and through said resistor to said cathode element, said resistor connected across a pair of electrical output conductors, one of said output conductors effecting an electrical connection to one end of the control winding of said two-phase motor, a capacitor for coupling the other of said output conductors to another end of said control winding so as to apply a controlling pulsating electrical output signal across said control winding, and another resistor connected between said control electrode and the first-mentioned resistor and through at least a portion of said first-mentioned resistor to said cathode element so as to provide a high negative feedback through said other resistor to the control electrode to prevent oscillation of the controlling pulsating output signal.

9. The combination comprising a two-phase motor having a fixed phase winding and a variable phase control winding, an electronic valve having an anode element, a cathode element, and a control electrode, a resistor connected at one end to said cathode element, means for impressing a variable pulsating electrical input signal to said control electrode and other end of said resistor and through said resistor to said cathode element, said resistor connected across a pair of electrical output conductors, one of said output conductors effecting an electrical connection to one end of the control winding of said two-phase motor, a capacitor for coupling the other of said output conductors to another end of said control winding so as to apply a controlling pulsating electrical output signal across said control winding, another resistor connected between said control electrode and the first-mentioned resistor and through at least a portion of said first-mentioned resistor to said cathode element so as to provide a high negative feedback through said other resistor to the control electrode to prevent oscillation of the controlling pulsating output signal, and another capacitor connected between said control electrode and said other end of said first-mentioned resistor so as to stabilize the impressed input signal.

10. In an amplifier and control circuit for a two-phase motor of a type including an electron flow control device having electrodes between which an electron flow may be effected and an electron flow control element, means for impressing a variable pulsating electrical input signal to said electron flow control element, and said two-phase motor having a fixed phase winding and a variable phase control winding including a phase shifting capacitor coupled with the control winding; the improvement comprising a resistor serially connected in said control circuit with said electrodes, and electrical conductors leading from opposite ends of said resistor for directly transferring a controlling pulsating output signal across said control winding and phase shifting capacitor coupled thereto.

11. The combination comprising an electron flow control device having electrodes between which an electron flow may be effected and an electron flow control element, means for impressing a variable pulsating electrical input signal on said control element, a two-phase motor having a fixed phase winding and a variable phase control winding, a resistor serially connected in circuit with said electrodes, said resistor connected across a pair of electrical output conductors, one of said output conductors effecting an electrical connection to one end of the control winding of said two-phase motor, and a capacitor for coupling the other of said output conductors to another end of said control winding so as to apply a controlling pulsating electrical output signal across said control winding.

12. In an amplifier and control circuit for a two-phase motor of a type including a transistor having a collector element, an emitter element and a base element, means for impressing a variable pulsating electrical input signal across said base and emitter elements, and said two-phase motor having a fixed phase winding and a variable phase control winding including a phase shifting capacitor coupled with the control winding; the improvement comprising a resistor serially connected in said control circuit with said emitter element, and electrical conductors leading from opposite ends of said resistor for directly transferring a controlling pulsating output signal across said control winding and phase shifting capacitor coupled thereto.

13. The combination comprising a transistor having a collector, an emitter and a base, means for impressing variable pulsating electrical input signals on said base, a two-phase motor having a fixed phase winding and a variable phase control winding, a resistor serially connected in circuit with said emitter, a pair of electrical output conductors leading from opposite ends of said resistor, one of said output conductors effecting an electrical connection to one end of the control winding of said two-phase motor, and a capacitor for coupling the other of said output conductors to another end of said control winding so that said output conductors apply controlling pulsating electrical output signals across said control winding due to a fall in potential across said resistor, and said fall in potential causing a retarding signal to be applied to said emitter which follows a change in the controlling electrical input signal impressed on said base to prevent oscillation in the controlling output signals applied across the control winding of said motor.

14. The combination comprising a transistor having a collector, an emitter and a base, control means for supplying variable pulsating electrical control signals, a varistor circuit means to attenuate said control signals of an amplitude in excess of a predetermined valve and substantially uneffect other of said control signals of an amplitude less than said predetermined value so as to provide resulant control signals of an amplitude less than a predetermined maximum value, means for amplifying said resultant signals so that there may be effected a high gain in the amplitude of said other control signals and said attenuated control signals within a predetermined operating range of values, a two-phase motor having a fixed phase winding and a variable phase control winding, a resistor serially connected in circuit with said emitter and collector, means for impressing the resultant amplified signals on said base and through said resistor on said emitter, a pair of electrical output conductors leading from opposite ends of said resistor, one of said output conductors effecting an electrical connection to one end of the control winding of said two-phase motor, and a capacitor for coupling the other of said output conductors to another end of said control winding so that said output conductors apply controlling pulsating electrical output signals across said control winding due to a fall in potential across said resistor, and said fall in potential causing a retarding signal to be applied to said emitter which follows a change in the controlling electrical input signal impressed on said base to prevent oscillation in the controlling output signals applied across the control winding of said motor.

15. The combination comprising a transistor having a collector, an emitter and a base, control means for supplying variable pulsating electrical control signals, varistor circuit means including a pair of oppositely poled silicon carbide diodes for attenuating said control signals having an amplitude in excess of a predetermined value and substantially uneffect other of said control signals of an amplitude less than said predetermined value so as to provide resultant control signals of an amplitude less than a predetermined maximum value, means for amplifying said resultant signals so that there may be effected a high gain in the amplitude of said other control signals and said attenuated control signals within a predetermined operating range of values, a two-phase motor having a fixed phase winding and a variable phase control winding, a resistor serially connected in circuit with said emitter and collector, means for impressing the resultant amplified signals on said base and through said resistor on said emitter, a pair of electrical output conductors leading from opposite ends of said resistor, one of said output conductors effecting an electrical connection to one end of the control winding of said two-phase motor, and a capacitor for coupling the other of said output conductors to another end of said control winding so that said output conductors apply controlling pulsating electrical output signals across said control winding due to a fall in potential across said resistor, and said fall in potential causing a retarding signal to be applied to said emitter which follows a change in the controlling electrical input signal impressed on said base to prevent oscillation in the controlling output signals applied across the control winding of said motor.

References Cited in the file of this patent

UNITED STATES PATENTS

| | | |
|---|---|---|
| 2,720,618 | Hanson | Oct. 11, 1955 |
| 2,844,776 | Duneff | July 22, 1958 |